(12) United States Patent
Arnaudov et al.

(10) Patent No.: US 10,437,432 B2
(45) Date of Patent: Oct. 8, 2019

(54) INTEGRATION OF USER INTERFACE TECHNOLOGIES

(71) Applicant: VMware, Inc., Palo Alto, CA (US)

(72) Inventors: Antoan Arnaudov, Sofia (BG); Tony Ganchev, Sofia (BG); Boian Tzonev, Sofia (BG)

(73) Assignee: VMware, Inc., Palo Alto, CA (US)

( * ) Notice: Subject to any disclaimer, the term of this patent is extended or adjusted under 35 U.S.C. 154(b) by 295 days.

(21) Appl. No.: 14/489,275

(22) Filed: Sep. 17, 2014

(65) Prior Publication Data

US 2015/0378538 A1    Dec. 31, 2015

Related U.S. Application Data

(60) Provisional application No. 62/018,357, filed on Jun. 27, 2014.

(51) Int. Cl.
| | |
|---|---|
| *G06F 3/048* | (2013.01) |
| *G06F 3/0484* | (2013.01) |
| *H04L 29/08* | (2006.01) |
| *H04L 29/06* | (2006.01) |
| *G06F 9/451* | (2018.01) |

(52) U.S. Cl.
CPC ............ *G06F 3/0484* (2013.01); *G06F 9/452* (2018.02); *H04L 65/4084* (2013.01); *H04L 65/4092* (2013.01); *H04L 65/605* (2013.01); *H04L 67/02* (2013.01)

(58) Field of Classification Search
CPC ...... G06F 3/0484; G06F 9/4445; G06F 9/452; H04L 65/4084; H04L 65/605; H04L 67/025; H04L 65/4092; H04L 67/02
See application file for complete search history.

(56) References Cited

U.S. PATENT DOCUMENTS 8,117,554 B1 *   2/2012   Grechishkin ......... G06F 9/4443
                                                               703/23
8,209,408 B1 *   6/2012   Huang ................ G06F 9/45558
                                                              709/223

(Continued)

FOREIGN PATENT DOCUMENTS

WO    WO 2008/042875    4/2008
WO    WO 2013/034980    4/2013

OTHER PUBLICATIONS

International Search Report and Written Opinion for International Patent Application No. PCT/US2015/037281, filed Jun. 23, 2015. dated Sep. 22, 2015. 11 pages.

*Primary Examiner* — Andrew T Chiusano
(74) *Attorney, Agent, or Firm* — Fish & Richardson P.C.

(57) ABSTRACT

Methods, systems, and computer programs for integration of user interface technologies. One of the methods includes receiving, from a user device, a user request to execute a web application, the web application being associated with one or more rendering systems, and each of the rendering systems executing one or more respective remote applications. Respective video streams for the remote applications are obtained from each of the rendering systems. Each of the video streams is provided for presentation on the user device. While the video streams are provided, data identifying a user event is received from the user device. The user event is determined to be intended for a first rendering system. The user event is provided to the first rendering system.

24 Claims, 6 Drawing Sheets

(56) References Cited

U.S. PATENT DOCUMENTS

| | | | | |
|---|---|---|---|---|
| 8,650,494 B1* | 2/2014 | Sampath | ........... | H04L 67/02 |
| | | | | 715/740 |
| 9,244,912 B1* | 1/2016 | Kominac | ........... | G06F 17/28 |
| 2002/0054052 A1* | 5/2002 | Sharma | ........... | G06F 17/30905 |
| | | | | 715/700 |
| 2006/0136835 A1* | 6/2006 | Hochmuth | ........... | G06F 3/1462 |
| | | | | 715/779 |
| 2006/0230169 A1 | 10/2006 | Kaplan et al. | | |
| 2007/0124474 A1* | 5/2007 | Margulis | ........... | G06F 3/14 |
| | | | | 709/226 |
| 2007/0136579 A1 | 6/2007 | Levy et al. | | |
| 2007/0294371 A1* | 12/2007 | Petri | ........... | G06F 17/30893 |
| | | | | 709/219 |
| 2008/0313545 A1* | 12/2008 | Patel | ........... | H04L 29/08846 |
| | | | | 715/738 |
| 2011/0107409 A1* | 5/2011 | Wilkinson | ........... | G06F 21/335 |
| | | | | 726/8 |
| 2011/0161485 A1 | 6/2011 | George et al. | | |
| 2012/0151369 A1* | 6/2012 | Kominac | ........... | H04L 67/02 |
| | | | | 715/740 |
| 2012/0297383 A1* | 11/2012 | Meisner | ........... | G06F 3/165 |
| | | | | 718/1 |
| 2012/0317236 A1* | 12/2012 | Abdo | ........... | H04L 67/02 |
| | | | | 709/219 |
| 2014/0026057 A1* | 1/2014 | Kimpton | ........... | G06F 9/4443 |
| | | | | 715/733 |
| 2015/0188973 A1* | 7/2015 | Kacmarcik | ........... | H04L 67/38 |
| | | | | 715/719 |
| 2016/0240170 A1* | 8/2016 | Scheepens | ........... | G09G 5/14 |

* cited by examiner

INTEGRATION OF USER INTERFACE TECHNOLOGIES

BACKGROUND

Applications can be executed on a server and provided to remote clients over a network, e.g., the Internet. The applications can be hosted on a server remote from the client and a user can interact with the remote applications using a variety of remote clients, including desktops, laptops, thin clients, smart phones, tablets, and so on.

Remote display protocols can be used to transfer the display of an application executing on a server to the remote client. During execution, the application can generate updates to the display, and the system can transfer the updated display data to the remote client using the remote display protocol.

SUMMARY

This document relates to integrating user interface technologies.

In general, one innovative aspect of the subject matter described in this specification can be embodied in methods that include the actions of: receiving, from a user device, a user request to execute a web application, wherein the web application is associated with a plurality of rendering systems, and wherein each of the rendering systems execute a respective remote application; obtaining respective display data for the remote applications from each of the rendering systems; generating a video stream from the display data obtained from the rendering systems; providing the video stream for presentation on the user device; and while providing the video stream: receiving data identifying a user event from the user device, determining that the user event is intended for a first rendering system of the plurality of rendering systems, and providing the user event to the first rendering system.

These and other embodiments can each optionally include one or more of the following features. Each rendering system is associated with a different user interface technology. Obtaining the display data from each of the rendering systems comprises: receiving, from each of the rendering systems, a respective rendering system video stream generated from an output of the remote application executing on the rendering system. Each rendering system video stream is generated from frame fragments generated by the corresponding remote application, and wherein each frame fragment is a snapshot of output generated by the corresponding remote application using a respective user interface technology. Generating the video stream from the display data obtained from the rendering systems comprises: generating the video stream from the rendering system video streams, wherein each frame of the video stream includes video data from each rendering system video stream in a respective portion of the frame. The actions include in response to the request, initiating a web application session for the user; generating an initial state for the web application session; obtaining context information modifying the initial state; and providing the context information to one or more of the rendering systems of the plurality of rendering systems. The actions include receiving the context information from the first rendering system; storing the context information; and providing the context information to a second rendering system of the plurality of rendering devices. The actions include obtaining the context information from a main view of the web application; storing the context information; and providing the context information to the first rendering system and to a second rendering system of the plurality of rendering devices.

The subject matter described in this specification can be implemented in particular embodiments so as to realize one or more of the following advantages. A web application that receives display data from multiple remote applications can be provided to a user for the user to interact with. The web application allows for the user to interact with the remote applications, allowing for the user to access the functionality of applications that might not be supported by the user's device, e.g., because the remote application uses a user interface technology that is not supported by the user's device. Furthermore, the remote applications can act as a cohesive application by sharing context information between each other. For example, a user can log-in to an account in a first remote application, and a second remote application can authenticate the user without prompting the user to log-in again.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
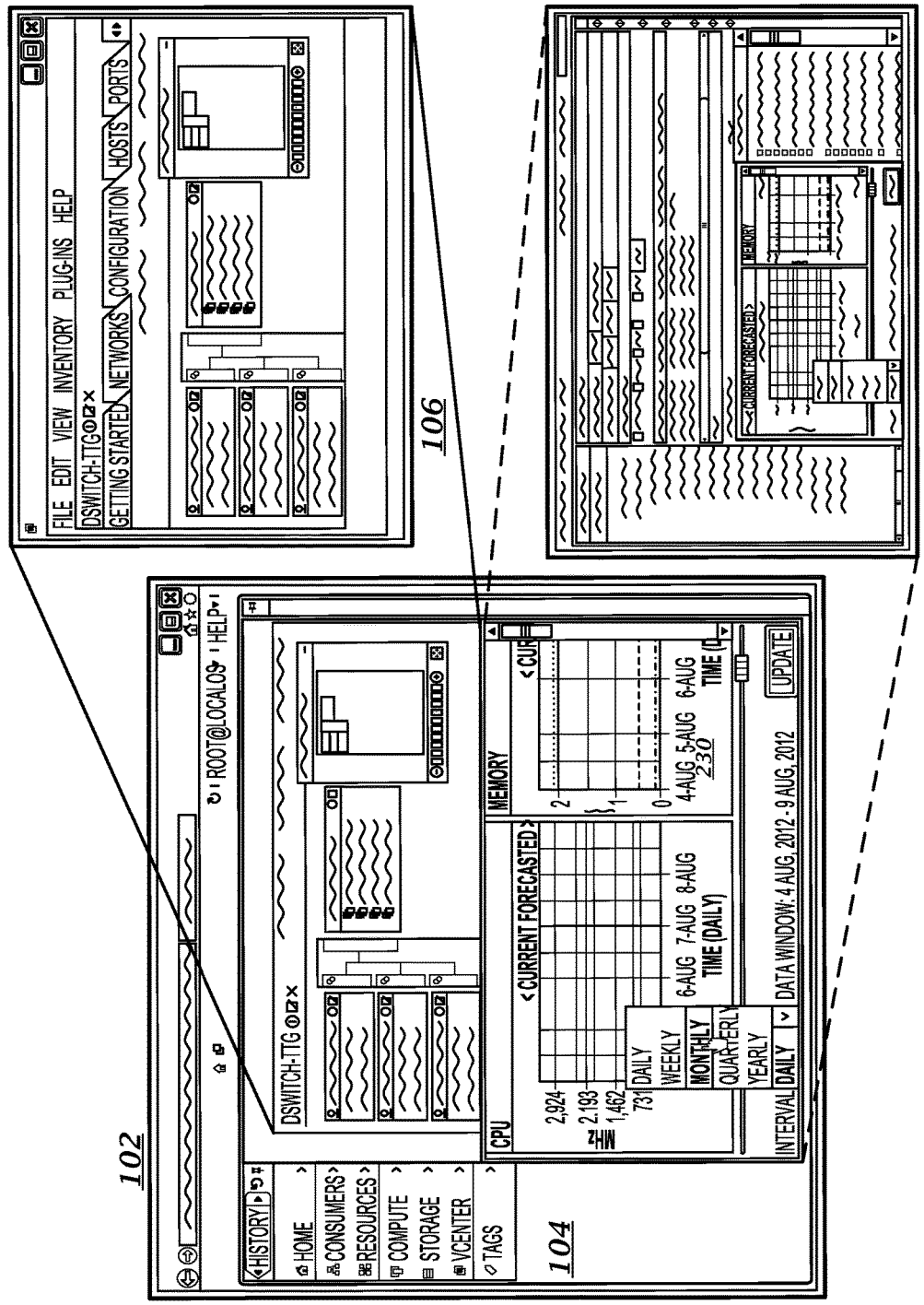
FIG. 1 is an example user interface displayed on a user device.

FIG. 1 is an example user interface 102 of an application displayed on a user device. In the example of FIG. 1 the application is a web application displayed in a web browser executing on the user device. In the example, the user interface 102 includes a first portion 106 that presents display data from a remote application, and a second portion 108 that presents display data from a different remote application. A remote application is an application executing on a computer system remote from the user device and that provides display data for the application to the user device over a network, e.g., the Internet, for presentation. For example, the user interface 102 can display a video stream that includes video generated from the display data generated by one remote application in the first portion 106 and video generated from the display data generated by another remote application in the second portion 108. The display data can be interacted with by a user, and the application can provide inputs to the remote application to the computer system.

Each of the two remote applications can generate display data using any arbitrary user interface ("UI") technology. Since the user interface 102 presents display data from the remote application and does not execute the remote applications locally, the user device need not support the UI technology in order to properly display the output of the remote applications. For example, even if the web browser cannot execute a particular kind of HyperText Markup Language ("HTML") code, e.g., HTML5 code, the web browser can receive display data from an application that uses HTML5.

Additionally, the remote applications can share context, e.g., information associated with an application that can be modified by a user. For example, a user can enter a user name and password into either the application 102 or a remote application, and the application 102 or remaining remote application can obtain the user name/password.

The user interface 102 also includes a main portion 104. In contrast to the portions 106 and 108, the main portion 104 displays content generated locally on the user device, e.g., in response to instructions received from a web application system. In the example of FIG. 1, the content includes menus that allow a user to interact with various functionality of the web application, e.g., to access different functionality offered by the web application, to view user-specific information, e.g., to view a history of the user's past web application sessions, and so on.

Figure 2:
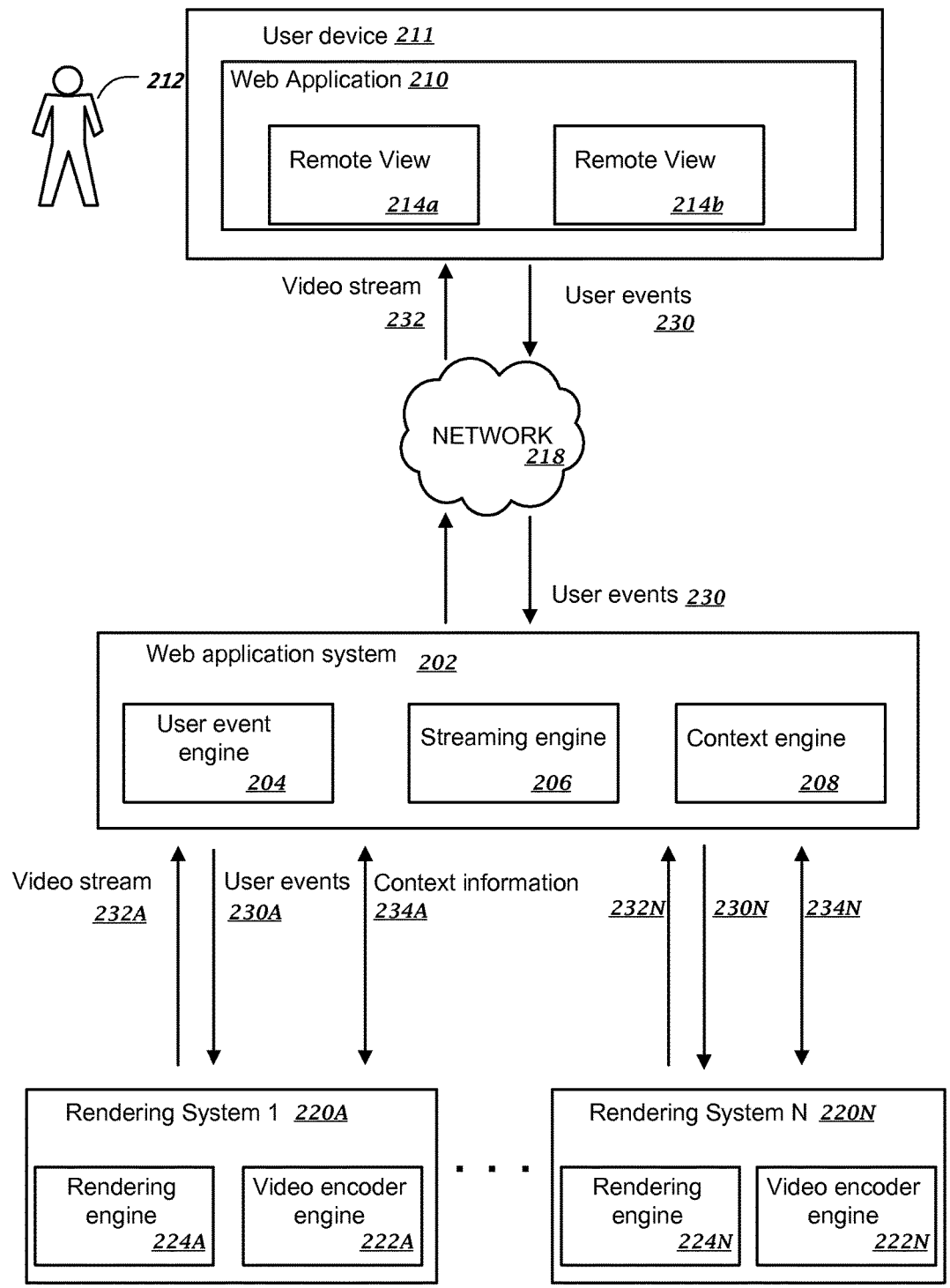
FIG. 2 shows an example web application system.

FIG. 2 shows an example web application system 202. The web application system 202 is an example of a system implemented as computer programs on one or more computers in one or more locations, in which the systems, components, and techniques described below, are implemented.

The web application system 202 receives a request from a user device 211 over a network 218 to execute a web application 210 on the user device 211, e.g., in a web browser or other software application executing on the user device 211. The network 218 can be, e.g., a local area network (LAN) or a wide area network (WAN), e.g., the Internet, or a combination of networks.

In response to the request, the web application system 202 can provide a web application user interface for presentation on the user device that includes two or more remote views, e.g., remote view 214a and remote view 214b, that each display data received from the web application system 202. Each remote view 214 displays data from a different remote application that is associated with the web application and that executes on a respective rendering system 220A-220N.

Upon receipt of the request, the web application system 202 can provide information to two or more rendering engines 224A-N that are included in the respective rendering systems 220A-N associated with the web application 210. Each rendering engine 224A-N executes a respective remote application and provides display data from the remote application to a video encoder engine 222A-N included in the corresponding rendering system 220A-N. Each remote application generates display data using a respective user interface technology, e.g., HTML5, SILVERLIGHT, FLASH, JAVA, and so on, and the user interface technology used by each remote application can be different from the user interface technology used by other remote applications. The rendering systems 220 A-N associated with Web user interface technologies, e.g., HTML5, JavaScript, and so on, can include headless browsers executing on a computing system, e.g., a browser that generates display data from applications associated with Web user interface technologies and stores the display data in memory rather than rendering the display data on a display. The headless browsers can execute remote applications associated with Web user interface technologies, and generate display data from the remote applications to provide to a corresponding video encoder engine 222A-N. Rendering systems 220 A-N associated with desktop user interface technologies, e.g., C, C++, or Java, can include computing systems executing operating systems that can execute remote applications, or executing virtual machines that can execute the remote applications. The computing systems executing remote applications, or virtual machines that execute remote applications, can generate display data from the remote applications and provide it to the video encoder engine 222A-N. Each video encoder engine 222A-N can obtain frames from the display data of the corresponding executing remote application and generate a video stream 232A-N to provide to the web application system 202. In generating the video streams 232 A-N, each video encoder engine 222 A-N can encode the video streams 232 A-N using an encoder format, e.g., a video codec used to compress the size of the generated video stream.

The web application system 202 includes a streaming engine 206 that receives the video streams 232A-N from the rendering systems 220A-N and channels the video streams 232A-N for presentation on the user device 211. The streaming engine 206 provides each received video stream 232 A-N to a respective remote view 214 a-b on the user device 211. Additionally, the streaming engine 206 can provide transcoding functionality to the received video streams 232A-N, e.g., the streaming engine 206 can receive a video stream encoded in a first format, and transcode the video stream to a second format suitable for the web application 210. The system can determine that the web application can only present video streams encoded in particular encoder formats from the web application, e.g., the web application can identify to the system one or more suitable encoder formats. In some implementations the web application can obtain information about the capabilities of the user device, e.g., the information can identify that the user device can only decode video streams encoded in particular encoder formats.

While the streaming engine 206 provides the video stream 232 to the web application 210, the web application system 202 can receive user events identifying inputs into a particular remote view 214 from a user 212. The web application 210 is configured to identify user events, e.g., mouse clicks, keyboard key presses, swipes, double taps, audio, gestures, biometrics, fingerprints, temperature, humidity, gyroscopic motion, or other user interactions with the web applications and provide the user events to the web application system 202. The user event can identify the specific input, e.g., mouse, swipe, and a location of the input in the web application user interface.

The web application system 202 includes a user event engine 204 that receives user events 230 and determines a rendering system 220 A-N to provide the user event 230 to. In particular, the user event engine 204 receives a user event 230 identifying a specific input and a location of the input, e.g., a coordinate for the input or region of the web application that corresponds to the input. The user event engine 204 can determine which remote view 214 the location is included in from the information received from the web application 210. After determining a remote view 214 that the user event is associated with, the user event engine 204 can provide the user event 230 to the respective rendering system 220 A-N that generates display data presented in the remote view associated with the user event 230.

Upon receiving a user event 230A-N from the web application system 202, the rendering engine 224A-N can provide the user event 230 as a user input to the remote application executing on the rendering system 220 A-N.

The web application system 202 includes a context engine 208 that maintains data identifying a session state for each web application session and shares context information, e.g., data, parameters, or values identified in the session state for the session, among the remote applications. The context engine 208 can modify the session state during the web application session and provide data identifying the updated session state to the rendering systems 220A-N executing the appropriate remote applications. Maintaining and updating state information is described in more detail below with reference to FIGS. 4, 5A, and 5B. In some implementations, each rendering system 220A-N can be configured to monitor the context engine 208 for modifications to specific pieces of data in the state information for the web application session, e.g., for data authenticating a user after a successful log-in. Passing of context between a rendering system 220 and the web application system 202 can be accomplished using a client/server connection technology, e.g., HTTPS, secured TCP, or a message based solution.

Figure 3:
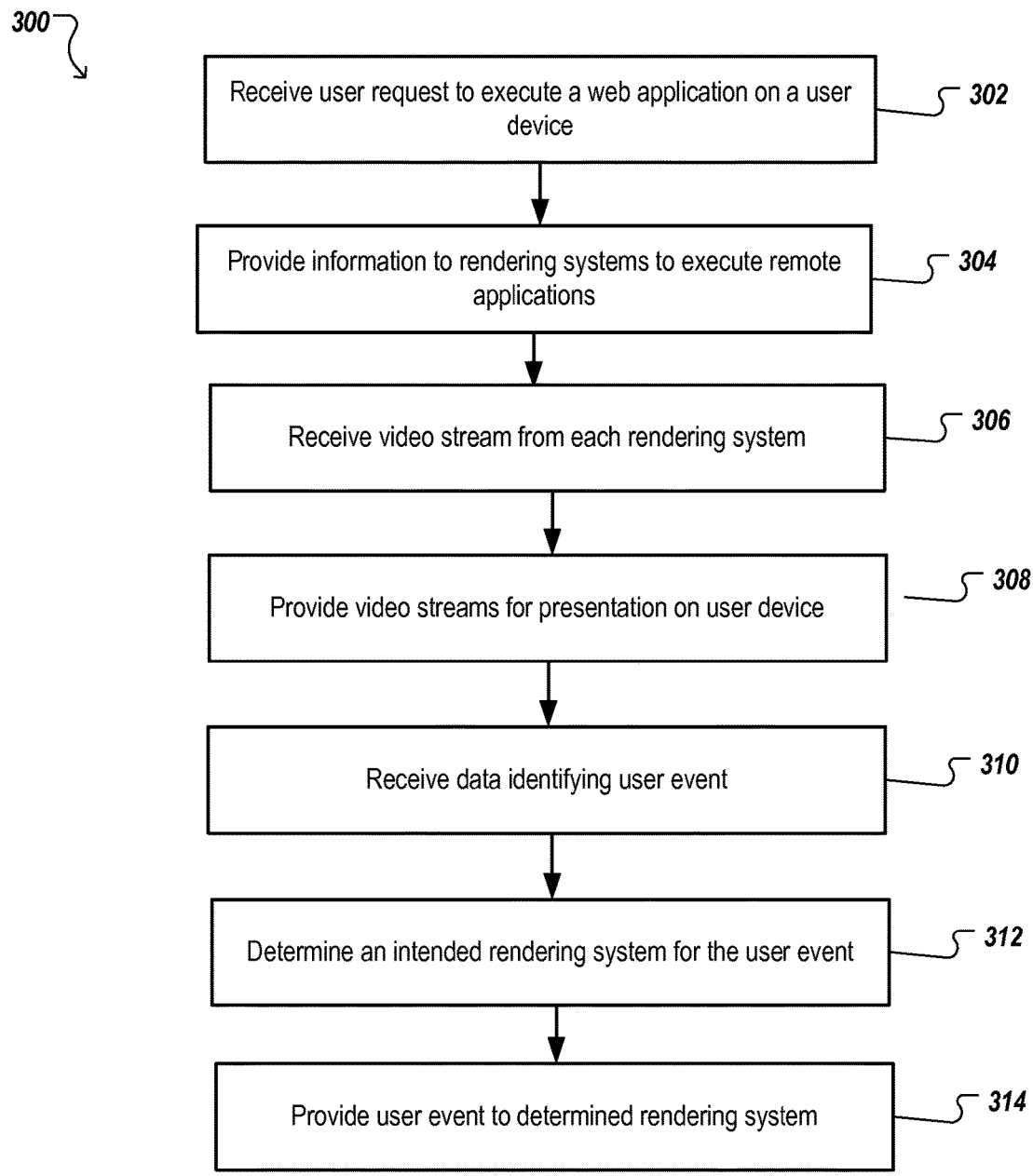
FIG. 3 illustrates an example process for user interface integration.

FIG. 3 illustrates an example process 300 for user interface integration. The process 300 will be described as being performed by a system of one or more appropriately programmed computers, e.g., the web application system 202 of FIG. 2.

The system receives a user request to execute a web application on a user device (step 302). The web application can execute in an application on the user device, e.g., a web browser, or can be a standalone application that can install on the user device. The web application can generate a user interface that includes two or more remote views, i.e., user interface elements, each configured to receive display data provided from a respective rendering system, e.g., rendering systems 220A-N in FIG. 2, executing a respective remote application.

The web application is associated with one or more rendering systems, e.g., the rendering systems that execute the remote applications that generate the display data to be presented in the web application user interface.

The system provides information to rendering systems, e.g., the rendering systems 220A-220N of FIG. 2, that execute the remote applications that identifies that a request to execute the web application has been received (step 304). For example, the system can provide instructions to the rendering systems that cause the rendering systems to begin executing the remote applications. The system stores an identifier of each remote application executing on a remote system and its associated remote view in the web application.

Additionally, after providing information to the rendering systems, the system registers each remote application in state data maintained by the system for the web application session. The state data identifies context information associated modified or created by each remote application and the web application. The context information can be information of an application, e.g., web application or remote application, that is modified by the user. For example, the user can specify that a color of the chrome in the web application is to be green, and the system can provide that information to each remote application to keep a consistent green theme. Additionally, the state data can include authentication information, e.g., an authentication token or username/password data, for a user of the web application. The system can provide the authentication information to each remote application to allow the user to be authenticated without a separate log-in process for each remote application. Sharing context data is described in more detail below with reference to FIG. 4.

The system receives a respective video stream from each of the rendering systems (step 306). After executing the remote applications, the remote applications generate display data. The rendering systems capture frames of generated display data, e.g., snapshots of the output generated by the remote application. A video encoder engine, e.g., one of the video encoder engines 222A-N of FIG. 2, combines the frames into a video stream for the remote application, e.g., using H264, MPEG4, or another video technology. The video encoder engine then provides the video stream to the system to the rendering system.

The system provides the video stream from each rendering system for presentation on the user device (step 308). The system can provide each received video stream to a respective remote view, e.g., a respective portion of the web application executing on the user device. In some implementations the system obtains the identifier for each remote view and its corresponding rendering system. The system provides each video stream to a respective remote view by matching the rendering system that generates the video stream with the respective remote view identifier.

The system receives data identifying a user event from the user device (step 310). In particular, the web application executing on the user device is configured to receive interactions with the presented display data of the remote applications, and provide data identifying the user interactions to the system. For example, the web application can identify a user event in a remote view, e.g., a click or touch input on the display data of the remote application, and provide data identifying the interaction to the system.

The system determines an intended rendering system for the received user event (step 312). In some implementations, the web application executing on the user device can identify a location in the web application of the user interaction, and provide that information to the system as part of the user event. The system can obtain the location and determine the remote application that corresponds to the location, e.g., by determining the remote view that corresponds to the location and then determining the remote application that presents display data in the remote view. In some implementations, instead of or in addition to the location information, the system also receives other data describing the user event. For example, the system can receive data identifying the state of the user interface when the user event was submitted, e.g., data identifying the currently active web user interface element, the currently active web control, currently active tab page, and so on. In these implementations, the system can determine which rendering system the currently active element is associated with and select that rendering system as the intended rendering system for the user event. In some other implementations, the web application executing on the user device can be configured to identify the remote application that the user event was provided to. For example, the web application can determine that the user event was intended for a remote view included in the web application.

Additionally, in some implementations, each rendering system can subscribe to receive particular types of user input from the system. For instance, a user can provide audio input, e.g., speech, to the web application. One or more rendering systems can subscribe to always receive audio input from the system. The system can store data identifying a subscription, e.g., the system can store types of user input and respective rendering systems that should always receive the user input. In these implementations, when a user input is received, the system determines whether any of the rendering systems have subscribed to user events of type, and then selects each subscribed rendering system as intended rendering systems for the user event.

The system provides the user event to the determined rendering system (step 314). The rendering system receives the user event and provides it to the executing remote application as a user input which may cause a change in the display data being generated by the remote application.

In some implementations, in addition to the display data for the remote applications, the web application user interface also includes a main view that presents content generated locally on the user device. For example, the content can include menus or other user interface elements for interacting with and configuring various functionality of the web application. When a user event is receiving interacting with content that is presented in the main view, the system processes the user event and provides instructions to the user device to cause the user device to modify the content displayed in the main view or to display content from a different remote application in one of the remote views, i.e., without forwarding the user event to any of the rendering systems. As described in more detail below with reference to FIG. 4, user events interacting with the main view can also modify the state of the web application session.

The system can receive additional user events from the user device, and in each case, can perform the steps 310-314 for each user event. For instance, a user can provide audio input, keyboard input, mouse clicks, and in each case the system can receive the user input and perform the steps, as described above. Additionally, while the web application is executing, the system can receive a request for display data for a new remote application that is associated with the web application. In response to the request, the system can perform the steps 304-308 to provide the video stream generated by the new remote application for presentation on the user device.

Figure 4:
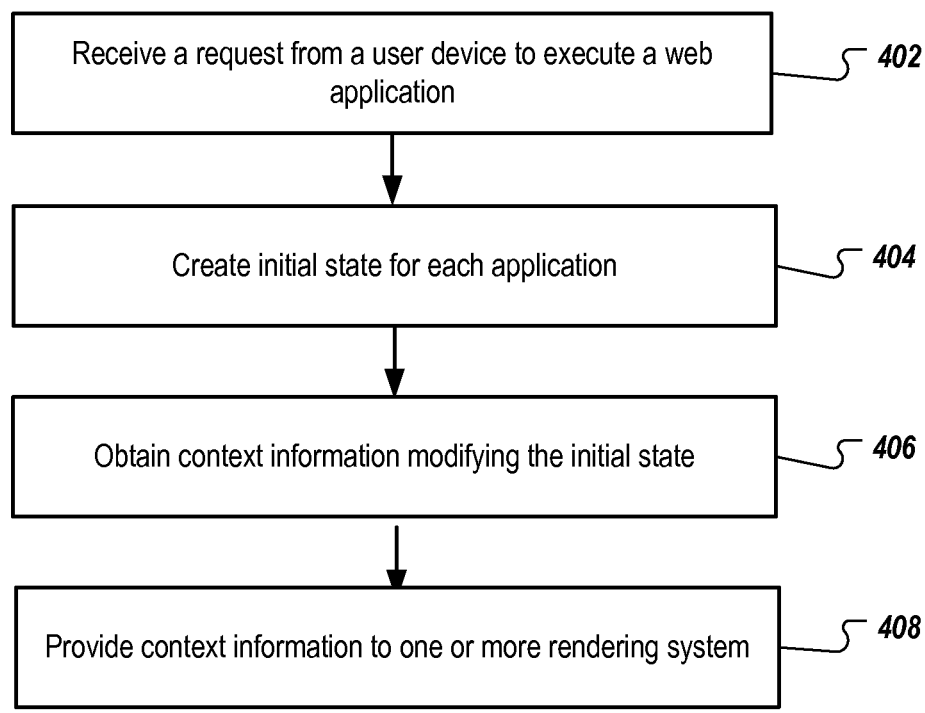
FIG. 4 illustrates an example process for using context information.

FIG. 4 illustrates an example process 400 for sharing context data between applications. The process 400 will be described as being performed by a system of one or more appropriately programmed computers, e.g., the web application system 202 of FIG. 2.

The system receives a request from a user device to execute a web application (step 402).

The system instantiates a web application session in response to the request and generates an initial state for the session (step 404). The initial state includes data identifying each rendering system associated with the web application, and an associated remote view of each rendering system. In some implementations, the state includes context information, with each piece of context information represented by an identifier for a remote application, the particular web application provided to the user, and one or more properties of data to be shared, e.g., user names, a particular object displayed in an application, and so on.

The system might have access to particular information already stored, e.g., user name/password, or a log-in certificate, e.g., an authentication token. For example, to access the web application, the system can require that a user log-in to the system to receive the web application. The already stored information can be stored by the system as context information in the initial state.

The system obtains context information modifying the initial state for the session (step 406). A user can provide a user event to the web application, e.g., to a remote view in the web application containing display data from a remote application, or to access functionality of the web application. The system receives the user event, described above with reference to FIG. 3, and determines whether to provide the user event to a rendering system, or whether the user event was intended for functionality of the web application.

If the user event is an input interacting with a main view of the web application that was intended to modify functionality of the web application, e.g., the user wanted to utilize different functionality of the web application, or to modify a state of the web application such as the background color of the web application user interface, the system can process the user event. After processing the user event the system can update the initial state with any modifications made to the web application.

Similarly, if the user event was intended for a remote application, the system can provide the user event to the rendering system executing the remote application and receive context information, e.g., information identifying a modification to the session state, from the rendering system and update the session state based on the context information. For example, the context information may be an update to a user preference, an authentication token indicative of a successful user log-in, user-entered text that should be shared among different remote applications, and so on.

In this way, the system can store information associated with an application that is either directly modified or entered by a user, e.g., user entered text or user selections of information, or that is the result of a user action, e.g., received log-in certificates.

The system provides context information identifying the modified state to one or more rendering systems (step 408). In some implementations, the system can provide information to one or more rendering systems in response to the state being modified. In some implementations, the system can maintain data identifying specific information or types of information to provide to particular rendering systems in response to that information modified. Upon identifying modifications to these specific types of information, the system can provide the context information to the rendering systems. In some implementations, the system can provide the context information identifying the modified state in response to receiving a request for modified state information from a rendering system.

In some implementations, the system can provide instructions to a rendering system when creating the initial state of the session that cause the rendering system to monitor the session state for updates to certain context information. For instance the system can provide information to a rendering system identifying that the rendering system should poll the system for updates to information relating to user name/password, specific objects in the web application the user has selected, and so on.

Figure 5A:
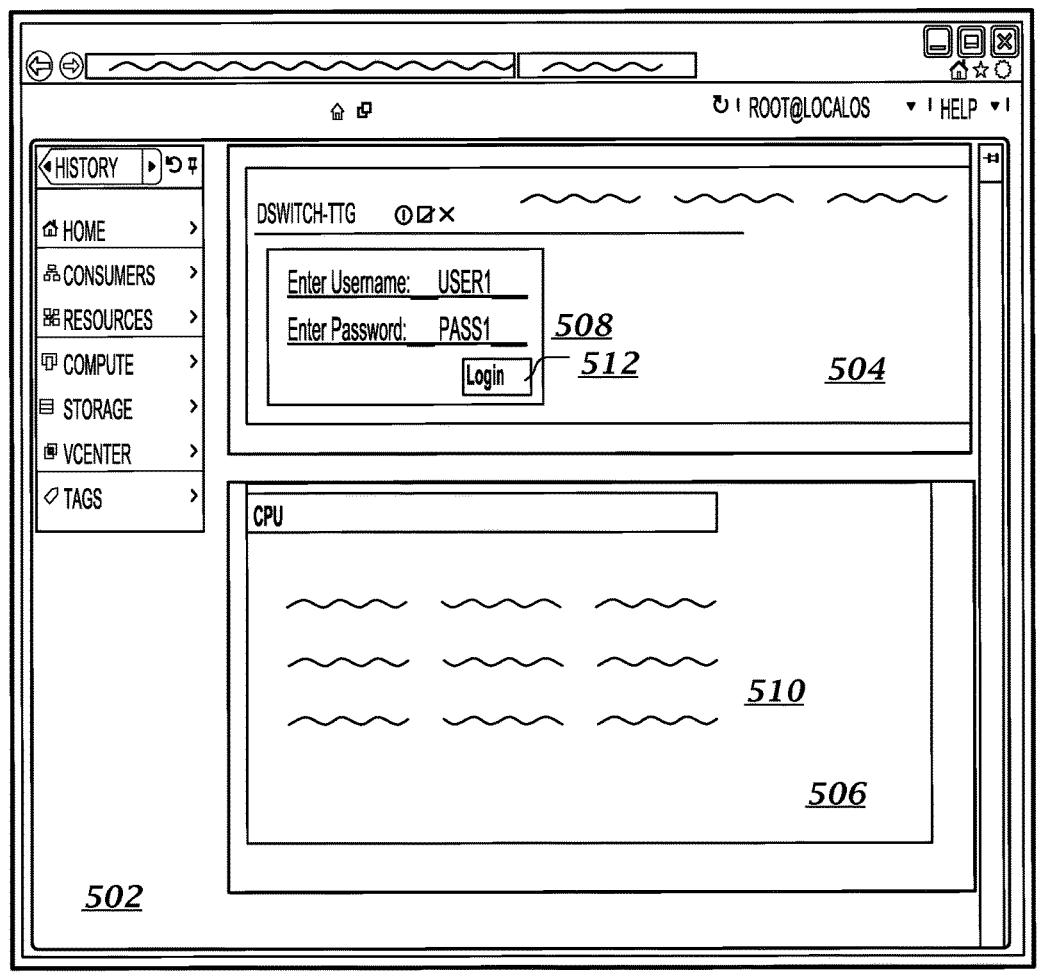
FIGS. 5A and 5B illustrate web application user interfaces that includes display data from two remote applications.

FIG. 5A illustrates a web application user interface 502 that includes display data from two remote applications, e.g., remote application 504 and remote application 506. Remote application 504 is displaying a log-in box 508 to a user of the web application 502. Here the user has provided a user event to the web application, e.g., text identifying USER1 as the user name, and PASS1 as the password. Remote application 506 is displaying different information 510 to the user not related to log-in information.

Once the user enters in the text in the log-in box 508, the user device provides a user event identifying the username and password entered by the user to a web application system. For instance, the user event can be a mouse click on a selectable object 512, e.g., a box, labeled "Login." In some implementations the user device can provide a coordinate address, e.g., an x and y coordinate, of the location of the mouse click in the remote view. The web application system receives the user event, provides the user event to the appropriate rendering system and updates state information for the corresponding web application session based on the user event. For example, the rendering system may provide an indication to the web application system that the user has successfully been authenticated using the log-in information. The web application system can then update the state information for the session to identify the user name of the user and to identify that the user has been successfully authenticated.

Figure 5B:
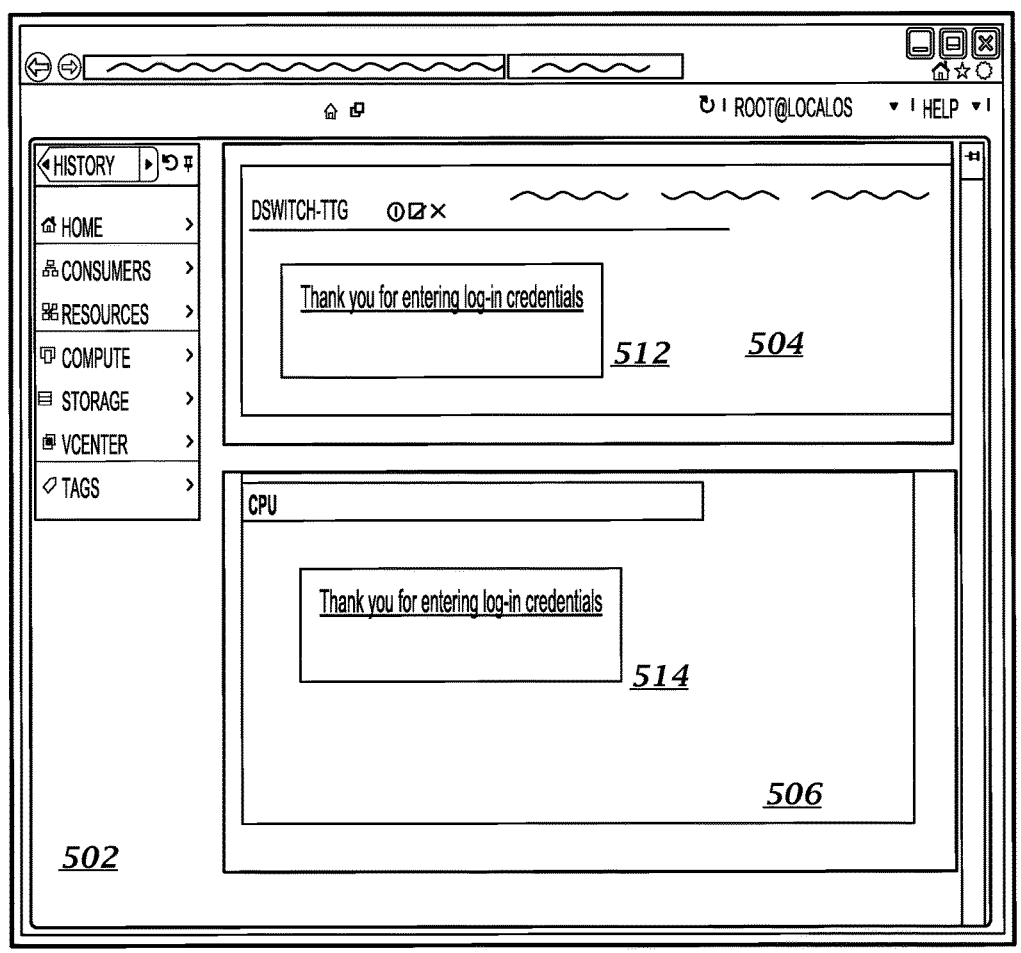

FIG. 5B illustrates a web application user interface 502 that includes display data from two remote applications, e.g., remote application 504 and remote application 506. Remote application 504, which was previously displaying a log-in box 508, is now displaying information identifying that the user entered in a valid user name/password 512. In the example, the user provided a user event to the web application that necessitated the remote application 506 accessing information behind a user log-in wall. The rendering system executing the remote application 506 then obtained context information that identifies the user name/password, e.g., by requesting the information from the web application system 202, or by the web application system 202 providing the information. Since the remote application 506 can access the context information, the remote application 506 received authentication information for the user without the user having to provide log-in credentials to the remote application 506 and accordingly the remote application 506 now presents information indicative of a successful authentication.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   receiving, from a user device and at a server, a user request to execute a web application, wherein the web application is associated with a plurality of rendering systems distinct from the server, and wherein each of the rendering systems executes one or more respective remote applications;
   obtaining one or more respective video streams for the remote applications from each of the rendering systems;
   providing each of the one or more video streams for each remote application obtained from the rendering systems for presentation as remote views in a web application user interface provided by a client application executing on the user device, the web application user interface including a first remote view portion that presents display data from a first remote application, a second remote view portion that presents display data from a second remote application, and a main view portion that displays content for the web application; and
   while providing the video streams for presentation as remote views in the web application user interface:
      receiving, at the server providing the web application user interface, data identifying a user event from the user device input to the user interface of the web application,
      determining, at the server, whether the user event is intended for processing by a particular rendering system or is directed to the main view portion of the web application interface processed by the server,
      wherein determining that the user event in the web application user interface is intended for a first rendering system of the plurality of rendering systems includes processing the event at the server, including location information identifying coordinates within the web application user interface associated with the user event, to determine that the user event is associated with a location within the first remote view portion corresponding to the remote application of the first rendering system, and
      providing the user event data from the server to the first rendering system for processing by the corresponding remote application.

2. The method of claim 1, wherein each rendering system is associated with a different user interface technology.

3. The method of claim 2, wherein obtaining video streams from each of the rendering systems comprises:
   receiving, from each of the rendering systems, a respective rendering system video stream generated from an output of the remote application executing on the rendering system.

4. The method of claim 3, wherein each rendering system video stream is generated by the rendering system from frame fragments generated by the corresponding remote application, and wherein each frame fragment is a snapshot of output generated by the corresponding remote application using a respective user interface technology.

5. The method of claim 1 further comprising:
   receiving, from a particular rendering system, a video encoded in a first encoder format;
   determining that the user device is not operable to decode a video stream in the first encoder format, and is operable to decode a video stream in a second encoder format; and
   transcoding the received video stream from the first encoder format to the second encoder format.

6. The method of claim 1, further comprising:
   in response to the request, initiating a web application session for the user;
   generating an initial state for the web application session;
   obtaining context information modifying the initial state; and providing the context information to one or more of the rendering systems.

7. The method of claim 6, further comprising:
receiving the context information from the first rendering system, the context information comprising user submitted authentication information;
storing the context information; and
providing the context information to a second rendering system of the one or more rendering systems to provide user authentication to the second rendering system.

8. The method of claim 6, further comprising:
obtaining the context information from a main view of the web application;
storing the context information; and
providing the context information to the first rendering system and to a second rendering system of the plurality of rendering devices.

9. The method of claim 1, wherein the one or more video streams includes a first video stream and a second video stream, wherein the first video stream is presented as the first remote view and the second video stream is presented as a second remote view in the web application user interface.

10. The method of claim 1, wherein determining that the user event is intended for the first rendering system includes determining a location of the user event within the web application user interface relative to location of the first remote view within the web application user interface.

11. The method of claim 1, wherein in response to determining that the user event is intended for the main view of the web application interface, processing the event data at the server.

12. The method of claim 1, further comprising:
in response to the request, initiating a web application session for the user;
generating an initial state for the web application session;
receiving context information identifying a modification to the web application session from the first rendering system; and
updating the web application session state based on the context information.

13. A system comprising:
one or more computer devices and one or more storage devices storing instructions that are operable, when executed by the one or more computers, to cause the one or more computers to perform operations comprising:
receiving, from a user device and at a server, a user request to execute a web application, wherein the web application is associated with a plurality of rendering systems distinct from the server, and wherein each of the rendering systems executes one or more respective remote applications;
obtaining one or more respective video streams for the remote applications from each of the rendering systems;
providing each of the one or more video streams for each remote application obtained from the rendering systems for presentation as remote views in a web application user interface provided by a client application executing on the user device, the web application user interface including a first remote view portion that presents display data from a first remote application, a second remote view portion that presents display data from a second remote application, and a main view portion that displays content for the web application; and
while providing the video streams for presentation as remote views in the web application user interface:
receiving, at the server providing the web application user interface, data identifying a user event from the user device input to the user interface of the web application,
determining, at the server, whether the user event is intended for processing by a particular rendering system or is directed to the main view portion of the web application interface processed by the server,
wherein determining that the user event in the web application user interface is intended for a first rendering system of the a plurality of rendering systems includes processing the event at the server, including location information identifying coordinates within the web application user interface associated with the user event, to determine that the user event is associated with a location within the first remote view portion corresponding to the remote application of the first rendering system, and
providing the user event data from the server to the first rendering system for processing by the corresponding remote application.

14. The system of claim 13, wherein each rendering system is associated with a different user interface technology.

15. The system of claim 14, wherein obtaining video streams from each of the rendering systems comprises:
receiving, from each of the rendering systems, a respective rendering system video stream generated from an output of the remote application executing on the rendering system.

16. The system of claim 15, wherein each rendering system video stream is generated by the rendering system from frame fragments generated by the corresponding remote application, and wherein each frame fragment is a snapshot of output generated by the corresponding remote application using a respective user interface technology.

17. The system of claim 13, wherein the operations further comprise:
receiving, from a particular rendering system, a video encoded in a first encoder format;
determining that the user device is not operable to decode a video stream in the first encoder format, and is operable to decode a video stream in a second encoder format; and
transcoding the received video stream from the first encoder format to the second encoder format.

18. The system of claim 13, wherein the operations further comprise:
in response to the request, initiating a web application session for the user;
generating an initial state for the web application session;
obtaining context information modifying the initial state; and
providing the context information to one or more of the rendering systems of the one or more rendering systems.

19. The system of claim 18, wherein the operations further comprise:
receiving the context information from the first rendering system, the context information comprising user submitted authentication information;
storing the context information; and providing the context information to a second rendering system of the plurality of rendering devices to provide user authentication to the second rendering system.

20. The system of claim 18, wherein the operations further comprise:
   obtaining the context information from a main view of the web application;
   storing the context information; and
   providing the context information to the first rendering system and to a second rendering system of the one or more rendering systems.

21. A computer program product, encoded on one or more non-transitory computer storage media, comprising instructions that when executed by one or more computers cause the one or more computers to perform operations comprising:
   receiving, from a user device and at a server, a user request to execute a web application, wherein the web application is associated with plurality of rendering systems distinct from the server, and wherein each of the rendering systems executes one or more respective remote applications;
   obtaining one or more respective video streams for the remote applications from each of the rendering systems;
   providing each of the one or more video streams for each remote application obtained from the rendering systems for presentation as remote views in a web application user interface provided by a client application executing on the user device, the web application user interface including a first remote view portion that presents display data from a first remote application, a second remote view portion that presents display data from a second remote application, and a main view portion that displays content for the web application; and
   while providing the video streams for presentation as remote views in the web application user interface:
      receiving, at the server providing the web application user interface, data identifying a user event from the user device input to the user interface of the web application,
      determining, at the server, whether the user event is intended for processing by a particular rendering system or is directed to the main view portion of the web application interface processed by the server,
      wherein determining that the user event in the web application user interface is intended for a first rendering system of the plurality of rendering systems includes processing the event at the server, including location information identifying coordinates within the web application user interface associated with the user event, to determine that the user event is associated with a location within the first remote view portion corresponding to the remote application of the first rendering system, and
      providing the user event data from the server to the first rendering system for processing by the corresponding remote application.

22. The computer program product of claim 21, wherein each rendering system is associated with a different user interface technology.

23. The computer program product of claim 21, wherein the operations further comprise:
   in response to the request, initiating a web application session for the user;
   generating an initial state for the web application session;
   obtaining context information modifying the initial state; and
   providing the context information to one or more of the rendering systems of the plurality of rendering systems.

24. The computer program product of claim 23, wherein the operations further comprise:
   obtaining the context information from a main view of the web application;
   storing the context information; and
   providing the context information to the first rendering system and to a second rendering system of the one or more rendering systems.

* * * * *